United States Patent
Rao et al.

(10) Patent No.: US 9,521,073 B2
(45) Date of Patent: Dec. 13, 2016

(54) ENHANCED FINE-GRAINED OVERLAY TRANSPORT VIRTUALIZATION MULTI-HOMING USING PER-NETWORK AUTHORITATIVE EDGE DEVICE SYNCHRONIZATION

(71) Applicant: Cisco Technology, Inc., San Jose, CA (US)

(72) Inventors: Dhananjaya Rao, Milpitas, CA (US); Hasmit Grover, Fremont, CA (US); Shekher Bulusu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 13/654,491

(22) Filed: Oct. 18, 2012

(65) Prior Publication Data

US 2014/0112203 A1  Apr. 24, 2014

(51) Int. Cl.
*H04L 12/715* (2013.01)
*H04L 12/46* (2006.01)
*H04L 12/66* (2006.01)
*H04L 12/64* (2006.01)
*H04L 12/705* (2013.01)

(52) U.S. Cl.
CPC .......... *H04L 45/64* (2013.01); *H04L 12/4625* (2013.01); *H04L 12/6418* (2013.01); *H04L 12/66* (2013.01); *H04L 45/18* (2013.01)

(58) Field of Classification Search
CPC .... H04L 12/66; H04L 12/462; H04L 12/4625; H04L 12/4633; H04L 45/18; H04L 45/64
See application file for complete search history.

(56) References Cited

U.S. PATENT DOCUMENTS

| | | | |
|---|---|---|---|
| 5,844,902 A * | 12/1998 | Perlman | 370/401 |
| 7,675,869 B1 * | 3/2010 | Anker et al. | 370/255 |
| 9,071,539 B2 * | 6/2015 | Zhou | |
| 2007/0086361 A1 * | 4/2007 | Allan et al. | 370/254 |
| 2007/0204021 A1 * | 8/2007 | Ekl et al. | 709/223 |
| 2007/0258390 A1 * | 11/2007 | Khan et al. | 370/256 |
| 2009/0037607 A1 * | 2/2009 | Farinacci et al. | 709/249 |

* cited by examiner

Primary Examiner — Habte Mered
(74) Attorney, Agent, or Firm — Merchant & Gould P.C.

(57) ABSTRACT

In some embodiments, edge devices associated with a network segment are identified. One of the devices is elected as an authoritative device and any previous authoritative devices are instructed to halt forwarding network traffic to an overlay network.

20 Claims, 3 Drawing Sheets

ENHANCED FINE-GRAINED OVERLAY TRANSPORT VIRTUALIZATION MULTI-HOMING USING PER-NETWORK AUTHORITATIVE EDGE DEVICE SYNCHRONIZATION

BACKGROUND

Overlay Transport Virtualization (OTV) is an IP-based functionality that provides Layer 2 extension capabilities over any transport infrastructure, whether it be Layer 2 based, Layer 3 based, IP switched, label switched, etc. OTV provides an overlay that enables Layer 2 connectivity between separate Layer 2 network domains (e.g., separate virtual local area networks, or VLANs) while keeping these domains independent and preserving the fault-isolation, resiliency, and load-balancing benefits of an IP-based interconnection. A virtual local area network (VLAN) is a group of computers and/or other networked devices that communicate as if they were connected via a single network switch, regardless of their physical location. OTV uses a concept known as MAC routing, which means a control plane protocol is used to exchange MAC reachability information between network devices providing LAN extension functionality. An edge device performs the OTV functions of receiving Layer 2 traffic for all VLANs that need to be extended to remote locations and dynamically encapsulates the Ethernet frames into IP packets that are then sent across a transport infrastructure. The IS-IS standard routing protocol may be used to implement a control plane for OTV and provide the capability of carrying MAC address information in type-length-value (TLV) segments of data packets.

When multiple edge devices are connected between a set of VLANs and the overlay, an authoritative edge device (AED) election mechanism identifies a designated forwarder for the set of VLANs. In conventional systems, the AED election is triggered independently and is uncoordinated among the multiple edge devices in the site, so a short timeout period of blackholing traffic is required to ensure two or more edge devices are not simultaneously AED and hence forwarding traffic for the same VLAN. This introduces a convergence delay when there are failures at an edge device that is the AED for some VLANs. Furthermore, multiple simultaneous misconfigurations, such as with both site-VLAN and site-id, can lead to a failure to prevent loops. Additionally, arbitrary merging and/or partitions of individual VLANs cannot be optimally handled.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
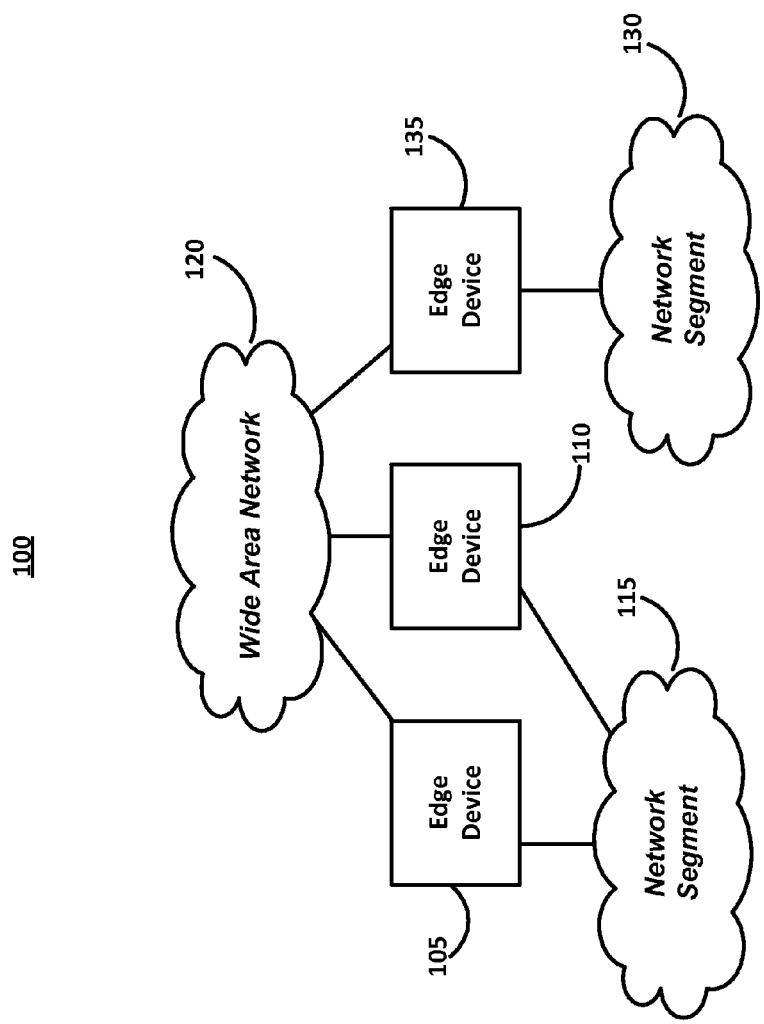
FIG. 1 is a block diagram of an operating environment.

Consistent with embodiments of the present disclosure, systems and methods are disclosed for providing authoritative edge device synchronization.

In some embodiments, edge devices associated with a network segment are identified. One of the devices is elected as an authoritative device and any previous authoritative devices are instructed to halt forwarding network traffic to an overlay network.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Overlay Transport Virtualization (OTV) Authoritative Edge Device (AED) election mechanism may be extended by adding a sequence of synchronization among the edge devices in the site before executing the results of the election. This extension makes the AED election and forwarding cutover event-driven and deterministic, ensuring rapid convergence and preventing loops. It also ensures an orderly transition of the AED status from one edge device to another. Any edge device that needs to give up AED status will do so after it stops forwarding on a network overlay serving as the transport infrastructure between disparate network domains (e.g, VLANs). Any edge device that needs to take over as AED will do so only after the previous AED has given up being AED.

The OTV AED election mechanism may be extended using an interlock with a site's Layer-2 (L2) access protocols. This provides greater visibility and allows the edge device to handle arbitrary site partitions and merges in a loop-free manner. Information that identifies a single L2 access network segment (e.g., a Root Bridge ID) is exchanged among the OTV edge devices on the overlay to identify the edge devices that are connected to the same network segment. The AED election is run on the set of these edge devices that connect to the same segment, so that only one edge device forwards traffic between the site and the overlay. Any time there needs to be a change in the AED, the overlay synchronization ensures a deterministic hand-off between the old AED and the new AED, guaranteeing that only one edge device ever forwards at a given time.

Since the network partition is used to scope the AED election, connectivity and forwarding for hosts in partitioned site networks is supported. Further, since the synchronization is done at the granularity of a VLAN, it supports non-congruent site topologies and non-congruent failures across different VLANs, including the site-VLAN. This also makes it more robust against multiple misconfigurations. The per-VLAN AED synchronization is carried out on the overlay, and the newly elected AED may receive notification from the overlay of its election. Hence, it is immune to partition merging issues occurring within the site, such as spanning tree protocol (STP) convergence.

In an STP network, OTV exchanges the STP root bridge identifier as part of an overlay synchronization and uses it in determining the AED election candidate set. To prevent loops, the STP transport network side performs a handshake with the OTV side of edge devices associated with a new segment and/or VLAN and conveys the root bridge identifier (RB-ID) for that VLAN. The OTV side disables forwarding onto the overlay for that VLAN and then responds to STP. The STP can then bring up an ports local to the VLAN from blocking forwarding so that the edge device can act as a switch on its local VLAN interfaces. Thus, this ordered handshake ensures that STP can converge quickly and the switch begin switching local traffic on the internal interfaces without being subject to delays in the overlay synchronization. Forwarding from the VLAN to other devices that are only reachable via the overlay on the STP network may be enabled only after overlay synchronization.

Consistent with embodiments of this disclosure, a similar approach may be used for FabricPath enabled site networks. A FabricPath network uses a link-state protocol to allow for multiple active parallel paths in an Ethernet network. The FabricPath network selects a Root Bridge Identifier (RB-ID) using the Layer 2 network information propagation extensions and this ID will be communicated to OTV by the edge device. OTV then exchanges it on the overlay. When two FabricPath networks become connected, the link between them will not be brought up for forwarding until the RB-ID has been reconciled and conveyed to the edge devices connecting the two FabricPath networks to the overlay. Then the same procedure as above is followed and the edge device(s) in one of the merged sites will disable overlay forwarding. The FabricPath link is then allowed to come up, and the OTV edge devices use the AED election to determine the proper set of AEDs for the VLANs being forwarded across the two FabricPath networks.

FIG. 1 is a block diagram view of an operating environment 100 for providing authoritative edge device (AED) synchronization. Operating environment 100 may comprise a first OTV edge device 105 and a second OTV edge device 110 that may connect a first network segment 115 to a wide area network (WAN) 120. First network segment 115. WAN 120 may also connect to a second network segment 130 via a third OTV edge device 135. First edge device 105 may be elected as an authoritative edge device and thus may be operative to receive layer 2 traffic from a plurality of VLANs (not shown) associated with first network segment 115 for relay to WAN 120 and/or network devices associated with second network segment 130.

OTV uses a control plane communicating between the OTV edge devices (e.g., first OTV edge device 105, second OTV edge device 110, and third OTV edge device 130) to advertise MAC address reachability information. Before MAC reachability information can be exchanged, the OTV edge devices first become "adjacent" to each other from an OTV perspective. This can be achieved in different ways, depending on the nature of the transport network (e.g., WAN 120) interconnecting the various network segments. If the transport network is multicast enabled, a specific multicast group can be used to exchange the control protocol messages between the OTV edge devices. If the transport is not multicast enabled, one (or more) OTV edge devices can be configured as an adjacency server to which all other edge devices register; the adjacency server also communicates to the edge devices the list of devices belonging to a given overlay.

Figure 2:
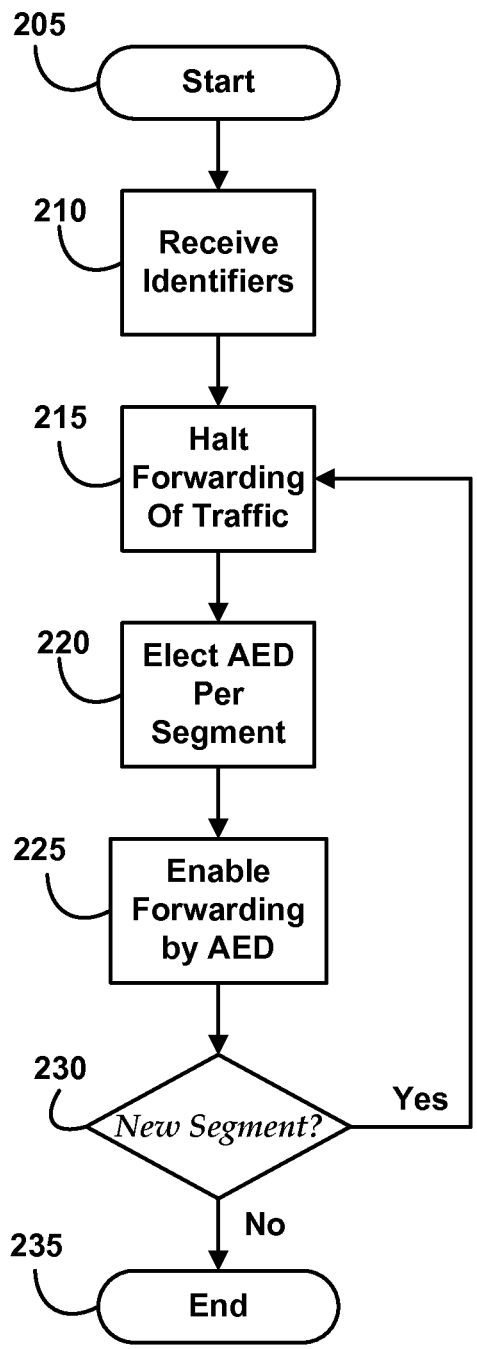
FIG. 2 is a flow chart illustrating a method for providing authoritative edge device synchronization.

FIG. 2 illustrates a flow chart setting forth the general stages involved in a method 200 consistent with an embodiment of the disclosure for providing authoritative edge device (AED) synchronization. Method 200 may be implemented using the components illustrated in operating environment 100 as described above. Ways to implement the stages of method 200 will be described in greater detail below. Method 200 begins at starting block 205 and proceeds to stage 210 where a computing device 300 receives identifiers from a plurality of edge devices. For example, first edge device 105 and second edge device 110 may exchange identifiers across an OTV overlay network operating on WAN 120.

Method 200 may then advance to stage 215 where computing device 300 halts forwarding of traffic from a local network segment onto the overlay. For example, when first edge device 105 had been operating as an AED, it may halt forwarding traffic from first network segment 115 onto WAN 120 until the new AED election is resolved. First edge device 105 may continue to act as a local switch for one or more VLANs associated with local network segment 115 while forwarding onto WAN 120 is halted.

Method 200 may then advance to stage 220 where computing device 300 elects an authoritative edge device. The election may be based on a priority associated with each edge device. The priority may comprise, for example, a configurable value set by an administrator, a site-identifier, a segment identifier, a randomly assigned priority, and/or any other value associated with and/or generated by the respective edge device.

Method 200 may then advance to stage 225 where computing device 300 may enable forwarding by the newly elected AED onto the overlay network. For example, if second edge device 110 is elected the new AED for first network segment 115, it may begin forwarding traffic from first network segment 115 onto WAN 120 by standard routing and/or via the overlay network. For example, the overlay network may provide a routing channel directly to an AED associated with second network segment 130 for routing of traffic destined for devices associated with that segment.

Method 200 may then advance to stage 230 where computing device 300 determines if a new segment has been connected. For example, a partioned segment of first network segment 115 may reconnect to WAN 120. The partitioned segment may be associated with another edge device that had been forwarding traffic for that segment. In such a case, a new election should be undertaken, and method 200 may return to stage 215 to halt forwarding of traffic by each of the disputing AEDs until the new election can be resolved. Otherwise, if no new segment is determined to have connected at stage 230, method 200 ends at stage 235.

Figure 3:
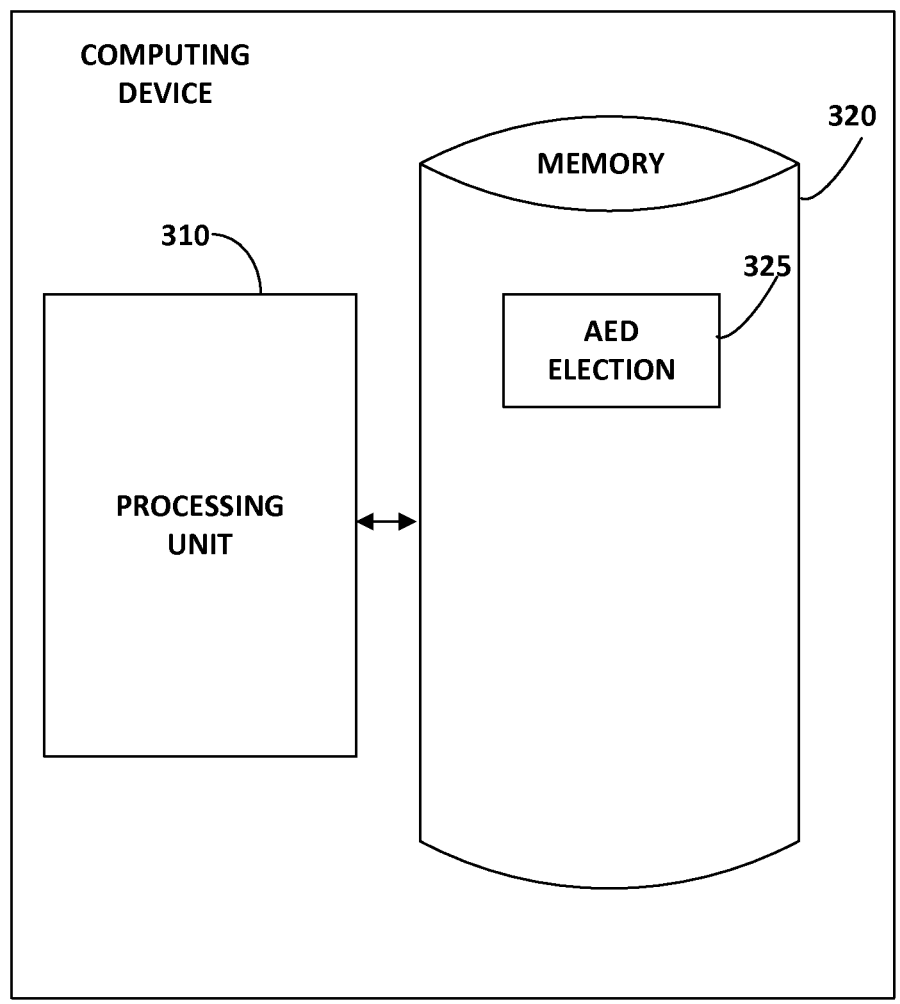
FIG. 3 is a block diagram illustrating components of a computing device.

FIG. 3 illustrates computing device 300 comprising a processing unit 310 and a memory unit 320. Memory 320 may include executable software to provide a authoritative edge device (AED) election algorithm 325 that may elect an AED from among a plurality of edge devices. While executing on processing unit 310, these and other software modules and/or data sources may perform processes for providing redundancy elimination in web caching, for example, via one or more stages included in method 200 described above with respect to FIG. 2. Moreover, any one or more of the stages included in method 200 may be performed on any element shown in operating environment 100 and each of the elements illustrated in operating environment 100 may comprise a similar computing device to that illustrated by FIG. 3.

Computing device 300 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   identifying a plurality of devices associated with a network segment;
   electing a first device of the plurality of devices as an authoritative device;
   determining whether a new network segment is being merged to the network segment;
   determining, in response to the determining that the new network segment being merged to the network segment, whether the new network segment has a second device as the authoritative device for the new network segment;
   in response to determining that the new network segment has the second device as the authoritative device, instructing the first device and the second device to halt forwarding network traffic to an overlay network;
   electing a third device as the authoritative device for a merged network segment upon receipt of a trigger for election of a new authoritative device, the trigger for election of the new authoritative device comprising the new network segment being merged, the merged network segment be associated with the third device as the authoritative device for forwarding traffic for the merged network segment, wherein electing the third device as the authoritative device comprises,
      exchanging information that identifies a single layer-2 access network segment among edge devices on the overlay network to identify a plurality of edge devices that are connected to the merged network segment, and
      running an election on the identified plurality of edge devices to elect the third device; and
   re-enabling forwarding onto the overlay network only by the elected authoritative device.

2. The method of claim 1, wherein exchanging the information comprises exchanging an identifier associated with the network segment among the plurality of network devices.

3. The method of claim 2, wherein the identifier comprises a root bridge identifier.

4. The method of claim 1, wherein the plurality of devices are associated with a virtual local area network (VLAN).

5. The method of claim 4, wherein the first device and the second device each comprise an edge device between the VLAN and the overlay network.

6. The method of claim 5, wherein the overlay network comprises an overlay transport virtualization (OTV) based overlay network.

7. The method of claim 1, further comprising:
   receiving, by the first device, a notification from the second device that it has halted forwarding network traffic to the overlay network.

8. A non-transitory computer-readable medium comprising instructions and when executed operable to:
   determine whether a new segment is being merged to a local network segment comprising a first authoritative device;
   determine, in response to the determining that the new segment being merged to the local network segment, whether the new segment has a second device as the authoritative device for the new segment;
   disable, in response to determining that the new segment has a second authoritative device, forwarding network traffic onto an overlay network by each of the first and second authoritative devices upon receipt of a trigger for election of a third authoritative device and prior to initiating the election for the third authoritative device, the trigger for election of the authoritative device comprising the new network segment being merged to the local network segment;
   elect the third authoritative edge device from among the plurality of edge devices, wherein electing the third device as the authoritative device comprises,
      exchanging information that identifies a single layer-two access network segment among edge devices on the overlay network to identify a plurality of edge devices that are connected to the merged network segment, and
      running an election on the identified plurality of edge devices to elect the third device; and
   re-enable forwarding onto the overlay network only by the elected third authoritative edge device.

9. The non-transitory computer-readable medium of claim 8, wherein the information comprises a root bridge identifier.

10. The non-transitory computer-readable medium of claim 8, wherein the overlay network comprises a spanning tree protocol (STP) based network.

11. The non-transitory computer-readable medium of Claim 8, wherein the network segment comprises a Virtual Local Area Network (VLAN).

12. The non-transitory computer-readable medium of claim 8, wherein the network segment comprises a Fabric-Path based network.

13. The non-transitory computer-readable medium of claim 8, further operable to:
  receive a new network device identifier associated with a newly connected edge device; and
  disable forwarding of network traffic onto the overlay network by the authoritative edge device.

14. The non-transitory computer-readable medium of claim 11, further operable to:
  determine whether the newly connected edge device should be elected the authoritative edge device; and
  in response to determining that the newly connected edge device should be elected the authoritative edge device, enable the newly connected edge device to forward network traffic onto the overlay network.

15. An apparatus comprising:
  a memory storage; and
  a processor coupled to the memory storage, wherein the processor is configured to:
    determine whether a second network segment is being merged to a first network segment associated with a first authoritative device;
    determine, in response to the determining that the second network segment being merged to the first network segment, whether the second network segment is associated with a second authoritative device;
    disable, in response to determining that the second network segment is associated with the second authoritative device, network traffic forwarding to an overlay network by each of the first authoritative device and the second authoritative device upon receipt of a trigger for election of a third authoritative device and prior to initiating the election for the third authoritative device, the trigger for election of the authoritative device comprising the second network segment being connected to the first network segment, a connected network segment be associated with the third authoritative device for forwarding traffic for the connected network segment;
    elect the third authoritative device for the connected network segment, wherein the processor being configured to elect the third authoritative device comprises the processor being configured to:
      exchange information that identifies a single layer-2 access network segment among edge devices on the overlay network to identify a plurality of edge devices that are connected to the connected network segment, and
      run an election on the identified edge devices to elect one of the identified plurality of edge devices as the third authoritative device; and
    in response to electing the third authoritative device for the connected network segment, resume, only by the elected third authoritative device, forwarding network traffic to the overlay network.

16. The apparatus of claim 15, wherein the local network segment comprises a virtual local area network (VLAN).

17. The apparatus of claim 15, wherein the processor is further operable to switch network traffic on the VLAN.

18. The apparatus of claim 15, wherein the processor is further configured to continue to switch network traffic on the VLAN while network traffic forwarding to the overlay network is disabled.

19. The apparatus of claim 15, wherein the overlay network comprises a spanning tree protocol (STP) network.

20. The apparatus of claim 15, wherein the processor further operative to send a notification of election of the third authoritative device for the connected network segment.

* * * * *